(12) United States Patent
Peterson

(10) Patent No.: US 8,057,631 B2
(45) Date of Patent: Nov. 15, 2011

(54) APPARATUS AND METHOD FOR APPLYING STRIPS OF THERMOPLASTIC MATERIAL TO THERMOPLASTIC MEMBRANES

(75) Inventor: Paul E. Peterson, Raynham, MA (US)

(73) Assignee: SIKA Technology AG, Zürich (CH)

( * ) Notice: Subject to any disclaimer, the term of this patent is extended or adjusted under 35 U.S.C. 154(b) by 346 days.

(21) Appl. No.: 12/378,258

(22) Filed: Feb. 12, 2009

(65) Prior Publication Data

US 2009/0151869 A1 Jun. 18, 2009

Related U.S. Application Data

(62) Division of application No. 11/324,886, filed on Jan. 4, 2006, now Pat. No. 7,686,056.

(51) Int. Cl.
*B32B 37/00* (2006.01)
*B29C 65/00* (2006.01)

(52) U.S. Cl. ................. 156/308.2; 156/71; 156/297

(58) Field of Classification Search .............. 156/71, 156/82, 308.2, 309.6, 324, 397, 497, 499, 156/574, 297, 299, 309.9, 322
See application file for complete search history.

(56) References Cited

U.S. PATENT DOCUMENTS

| | | | |
|---|---|---|---|
| 4,519,172 A | 5/1985 | Ristow | |
| 4,834,828 A | 5/1989 | Murphy | |
| 5,234,533 A * | 8/1993 | Neal | 156/497 |
| 5,572,843 A | 11/1996 | Jordan | |
| 6,187,122 B1 | 2/2001 | Hubbard et al. | |
| 6,230,461 B1 | 5/2001 | Piront | |
| 6,325,126 B1 | 12/2001 | Rubenacker et al. | |
| 6,453,964 B1 | 9/2002 | Pfotenhauer et al. | |
| 6,554,947 B2 | 4/2003 | Pfotenhauer et al. | |
| 2001/0040011 A1 * | 11/2001 | Rubenacker et al. | 156/497 |
| 2002/0074088 A1 * | 6/2002 | Pfotenhauer et al. | 156/391 |
| 2005/0183831 A1 * | 8/2005 | Schwetz | 156/497 |

* cited by examiner

*Primary Examiner* — John Goff

(74) *Attorney, Agent, or Firm* — Pandiscio & Pandiscio

(57) ABSTRACT

A method for applying thermoplastic strips to thermoplastic membranes, the method comprising applying a first strip to a membrane, providing apparatus comprising a housing having drive wheels thereon, a guide assembly fixed to the housing and comprising a first pair of guide wheels for disposition around the first strip and a second pair of guide wheels for disposition around a second strip to guide the second strip to a welding station mounted on the apparatus to heat weld the second strip to the membrane, mounting the first pair of guide wheels on the first strip, mounting the second pair of guide wheels on the second strip, moving the housing on the drive wheels, the first pair of guide wheels riding along the first strip and the second pair of guide wheels channeling the second strip therebetween and into the welding station for attachment to the membrane by the heat weld, the second strip thereby extending equidistantly from the first strip.

4 Claims, 11 Drawing Sheets

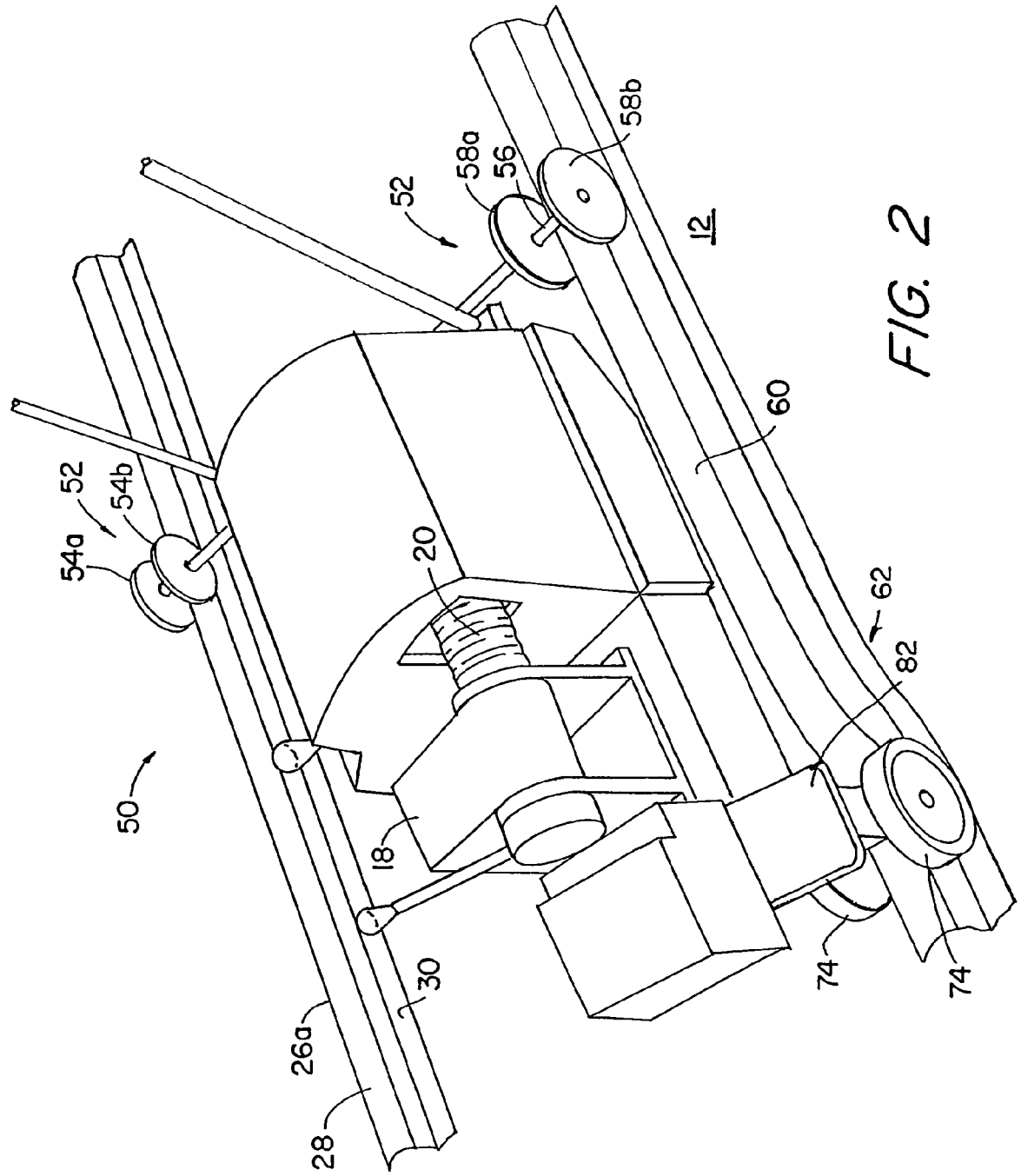

APPARATUS AND METHOD FOR APPLYING STRIPS OF THERMOPLASTIC MATERIAL TO THERMOPLASTIC MEMBRANES

CROSS-REFERENCE TO RELATED APPLICATION

This application is a divisional application of U.S. application Ser. No. 11/324,886, filed Jan. 4, 2006, in the name of Paul E. Peterson now U.S. Pat. No. 7,686,056.

BACKGROUND OF THE INVENTION

1. Field of the Invention

The invention relates to apparatus for cladding roofs and other surfaces of buildings with thermoplastic membranes, and is directed more particularly to an apparatus for applying upstanding thermoplastic strips to upper surfaces of the membranes.

2. Description of the Prior Art

It is known to apply thermoplastic membranes to roof tops to prevent leakage of water through the roof. Typically, the membranes are sealed to each other along overlapping edges. See, for example, U.S. Pat. No. 6,325,126, issued Dec. 4, 2001, to James Rubenacker et al. It is also known to apply metal sheets to roof tops. The metal sheets typically are configured with spaced stiffening ribs and with interlocking edges to join the metal sheets together. The interlocking edges of the ribs may then be covered with an upstanding channel member.

The appearance of the metal clad roof is generally regarded as quite attractive, in part because of the aesthetic qualities of the roof, and perhaps in part because of the perception that metal roofs are relatively expensive and therefore "attractive". For whatever reason, the appearance of metal roofs is generally acclaimed.

In view of the widespread appreciation of the appearance of metal clad roofs, there have been attempts to duplicate the appearance thereof in thermoplastic clad roofs. The distinctive characteristic of the metal clad roof is the presence of the upstanding channel members, or junctures, of the metals sheets. To duplicate this appearance, thermoplastic strips have been secured to the thermoplastic membranes, sometimes by adhesive, and sometimes by the application of heat. See, for example, U.S. Pat. No. 6,230,461, issued May 15, 2001, to Vincent Piront. Unfortunately, application of the strips manually is a time consuming and labor intensive process, increasing substantially the cost of the roofing and decreasing the cost advantage gained by selecting thermoplastics roofing over metal roofing. Further, manual application also increases opportunity for error and is not conducive to creating straight and/or parallel and/or equidistant lines.

In U.S. Pat. No. 6,453,964, issued Sep. 24, 2002, to Claus Pfotenhauer and Brian Whelan, and U.S. Pat. No. 6,554,947, issued Apr. 29, 2003, to Claus Pfotenhauer, Brian Whelan and James C. Rubenacker, there are shown and described an apparatus and method for attaching such strips to roof membranes to enhance appearance and provide for channeling of flow of rain water or melting snow to selected gutters or receptacles.

In use of the machines of the aforesaid '964 and '947 patents, the laying of each strip is accomplished independently of other strips previously laid. Thus, if equal distances between strips are desired, as is often the case, it is necessary to measure the appropriate distance and chalk or otherwise indicate the precise location desired for each strip in turn as it is applied. Such measuring and plotting of courses require time which, in turn, contributes to costs.

Accordingly, there is a need for a machine and method for applying strip after strip without the operator having to measure between each pair of strips or plot the whole area of concern at the start of the project.

Inasmuch as many machines of the type shown and described in the '964 and '947 patents, incorporated herein by reference, are in use, there is further a need for an assembly, or kit, including components which can be added to the '964 machine to provide the machine with the facility for automatic strip alignment.

SUMMARY OF THE INVENTION

An object of the invention is, therefore, to provide a machine and method for laying thermoplastic strips one after the other, side by side, with the strips spaced equidistantly along their lengths, without an operator having to measure and chalk off the desired lines for the strips.

A further object of the invention is to provide an assembly adapted for installation on the prior art machine of the '964 and '947 patents, as well as similar machines, the assembly providing the aforementioned facility for automatic strip alignment during the welding process.

With the above and other objects in view, a feature of the invention is the provision of an apparatus for applying strips of thermoplastic material to thermoplastic membranes, the strips each having an upstanding central portion extending widthwise thereof and opposed flange portions extending lengthwise from a base of the central portion. The apparatus includes a self-propelled housing assembly having drive wheels thereon for movably supporting the housing on the membrane, and a guide assembly fixed to the housing. The guide assembly includes a first pair of guide wheels for disposition around a previously applied first strip and movable along the first strip with one guide wheel on either side thereof, and a second pair of guide wheels for disposition around a second strip to be applied, and movable along the second strip so as to guide the second strip to a welding station mounted on the apparatus, the welding station being adapted to heat weld the second strip to at least one of the membranes. The second strip is thereby heat welded to the membrane along the length of the second strip equidistantly from the first strip.

In accordance with a further feature of the invention, there is provided an assembly for mounting on an apparatus for applying strips of thermoplastic material to thermoplastic membranes, the apparatus comprising a self-propelled housing having a motor, drive wheels, controls and control panel mounted thereon. The assembly includes a guide assembly which, in turn, includes a first pair of guide wheels for disposition around a previously applied first strip and movable along the first strip with a guide wheel on either side thereof, and a second pair of guide wheels for disposition around a second strip to be applied. The assembly further includes a nozzle for directing heated air to a weld area between a thermoplastic membrane and the thermoplastic strip, and weld wheels disposed adjacent a delivery end if the nozzle for pressing down on the thermoplastic strip to cause the strip to firmly engage the membrane immediately after heating of the strip and membrane by the nozzle.

In accordance with a still further feature of the invention, there is provided a method for applying strips of thermoplastic material to thermoplastic membranes, the strips each having an upstanding central portion extending widthwise from a base of the central portion. The method includes the steps of supplying a first thermoplastic strip to a thermoplastic membrane and providing an apparatus including a self-propelled housing assembly having drive wheels thereon for movably supporting the housing on the membrane, a guide assembly fixed to the housing assembly, the guide assembly including a first pair of guide wheels mounted on the apparatus for disposition around the previously applied first strip, and movable along the first strip with one guide wheel on either side thereof, and a second pair of guide wheels mounted on the apparatus for disposition around a second strip to be applied and movable along the second strip so as to guide the second strip to a welding station mounted on the apparatus, the welding station being adapted to heat weld the second strip to at least one of the membranes. The method further includes mounting the first pair of guide wheels on the first strip, mounting the second pair of guide wheels on the second strip, and moving the housing on the drive wheels thereof, the first pair of guide wheels riding along the first strip and the second pair of guide wheels channeling the second strip therebetween and into the welding station for attachment to the membrane by the heat weld, the second strip thereby extending equidistantly from the first strip along the length of the second strip.

The above and other features of the invention, including various novel detail of construction and combinations of parts and method steps, will now be more particularly described with reference to the accompanying drawings and pointed out in the claims. It will be understood that the particular devices and method embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, form which its novel features and advantages will be apparent.

In the drawings:

FIG. 2 is a perspective view of one form of machine illustrative of an embodiment of the invention;

DESCRIPTION OF THE PREFERRED EMBODIMENTS

Figure 1:
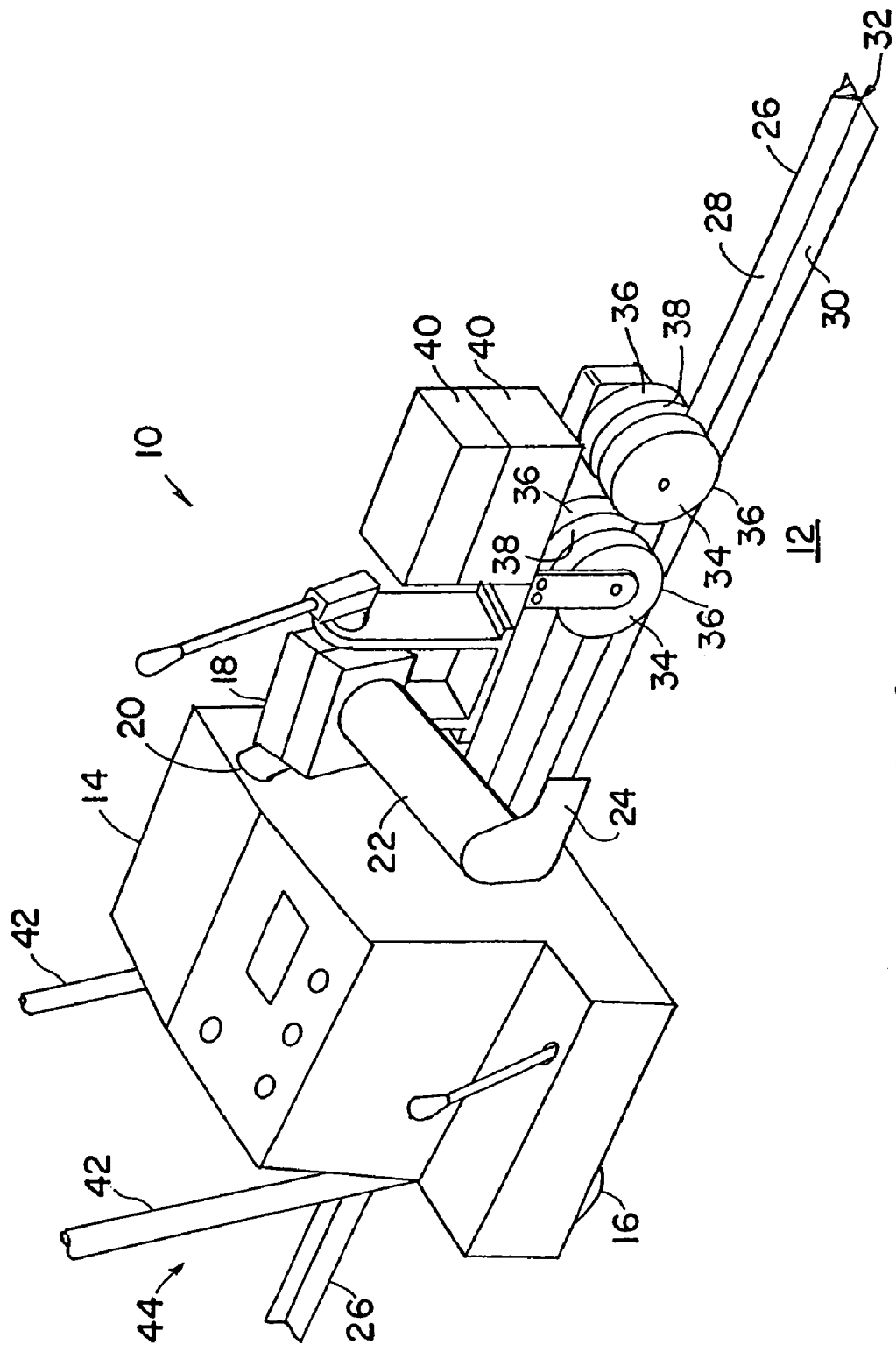
FIG. 1 is a perspective view of a prior art machine.

Referring to FIG. 1, it will be seen that a known hot air welding machine 10 for attaching thermoplastic strips of the type described above, to an underlying thermoplastic membrane 12 includes a self-propelled housing 14 having drive wheels 16 mounted thereon for movably supporting the housing 14 on the membrane 12.

The machine 10 includes an air blower (not shown) disposed within the housing 14, a heating element 18 for heating the air received from the blower, and a conduit 20 interconnecting the blower and the heating element 18. The heating element 18 discharges hot air into a chamber 22 which, in turn, channels heated air into a nozzle 24. The nozzle 24 is a hollow, generally flat, blade-like member that directs heated air between the bottom surface of a thermoplastic strip 26 and the upper surface of the underlying thermoplastic membrane 12. The chamber 22 and heating element 18 are mounted for pivotal movement between a raised position, shown in FIG. 1, to an operative position, shown as described hereinbelow.

The thermoplastic strip 26 is provided with an upstanding central portion 28 extending lengthwise of the strip, and opposed flange portions 30 extending widthwise from a base of the central portion 28. Bottom surfaces of the central portion 28 and the flange portions 30 provide a continuous strip bottom surface 32 for attachment to the thermoplastic membrane 12.

The machine 10 is provided with weld wheels 34 having peripheral surfaces 36 and spaced so as to provide a groove or gap 38 therebetween to accept the central portion 28 of a first strip 26. The weld wheels 34 are biased by a selected number of weight members 40 disposed above the weld wheels 34.

The machine 10 is provided with a handle 42 for manual manipulation of the machine prior to and after a heat welding operation.

In operation, the machine 10 is moved by a motor 35 driving the drive wheels 16, in the direction of the handle 42. The machine ingests the strip 26 at the front 44 of the machine, moves the nozzle 24 between the bottom surface 32 of the strip 26 and the upper surface of the membrane 12, directing heated air between and onto the two surfaces, followed immediately by the weld wheels 34, which push the strip into firm engagement with the membrane to effect a weld.

The machine 10 and the operation thereof is described and shown in greater detail in the aforementioned '964 and '947 patents, which are incorporated herein by reference. As noted above, in use of the machine 10, after laying of the first strip, subsequent strip placings typically are measured and marked off and the machine 10 is guided along the markings to properly place the subsequent strips relative to the first strip and to each other.

Figure 6:
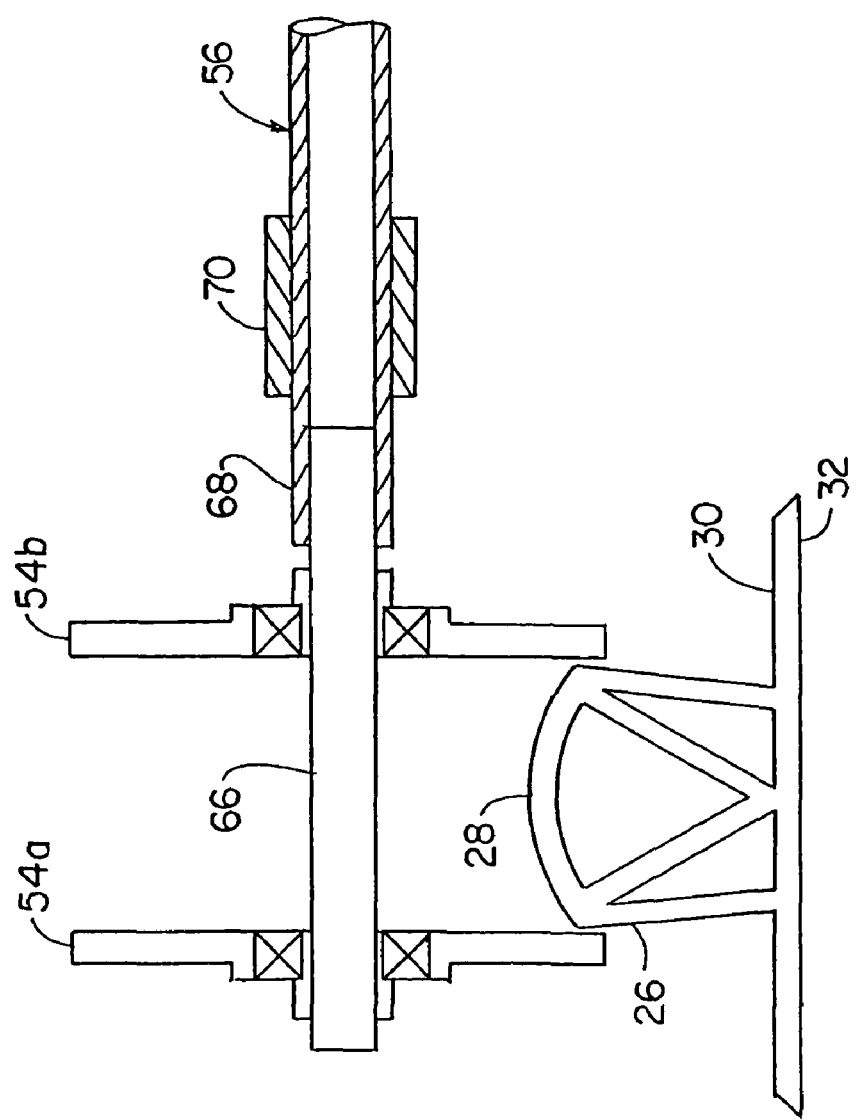
FIG. 6 is a sectional view taken along line VI-VI of FIG. 5.

In FIG. 2, there is shown the improved machine 50. Referring to FIG. 2, it will be seen that the improved machine has fixed thereon a guide assembly 52 which includes a first pair of guide wheels 54a, 54b for disposition around a previously applied first strip 26a. Depending upon the diameter of the guide wheels 54a, 54b, and the size of the strip central portion 28, the guide wheels may ride ob the strip flanges 30 or may, as shown in FIGS. 3, 4, and 6, ride along the top edges of the strip central portion An axle assembly 56 supports the first pair of guide wheels 54a, 54b and extends therefrom.

A second pair of guide wheels 58a, 58b are mounted on the axle assembly 56 (FIGS. 3-5) for disposition around a second strip 60 to be applied at a selected distance from the first strip 26a and equidistantly therefrom throughout the length of the second strip. The second pair or guide wheels 58a, 58b are movable along the second strip 60 so as to guide the second strip to a welding station 62 having an extended nozzle 64 (FIGS. 2A and 3) for directing heated air between the strip and the underlying membrane. Weld wheels 74 follow the nozzle 64 and complete the weld by pressing the strip 60 firmly into engagement with the membrane 12.

Figure 3:
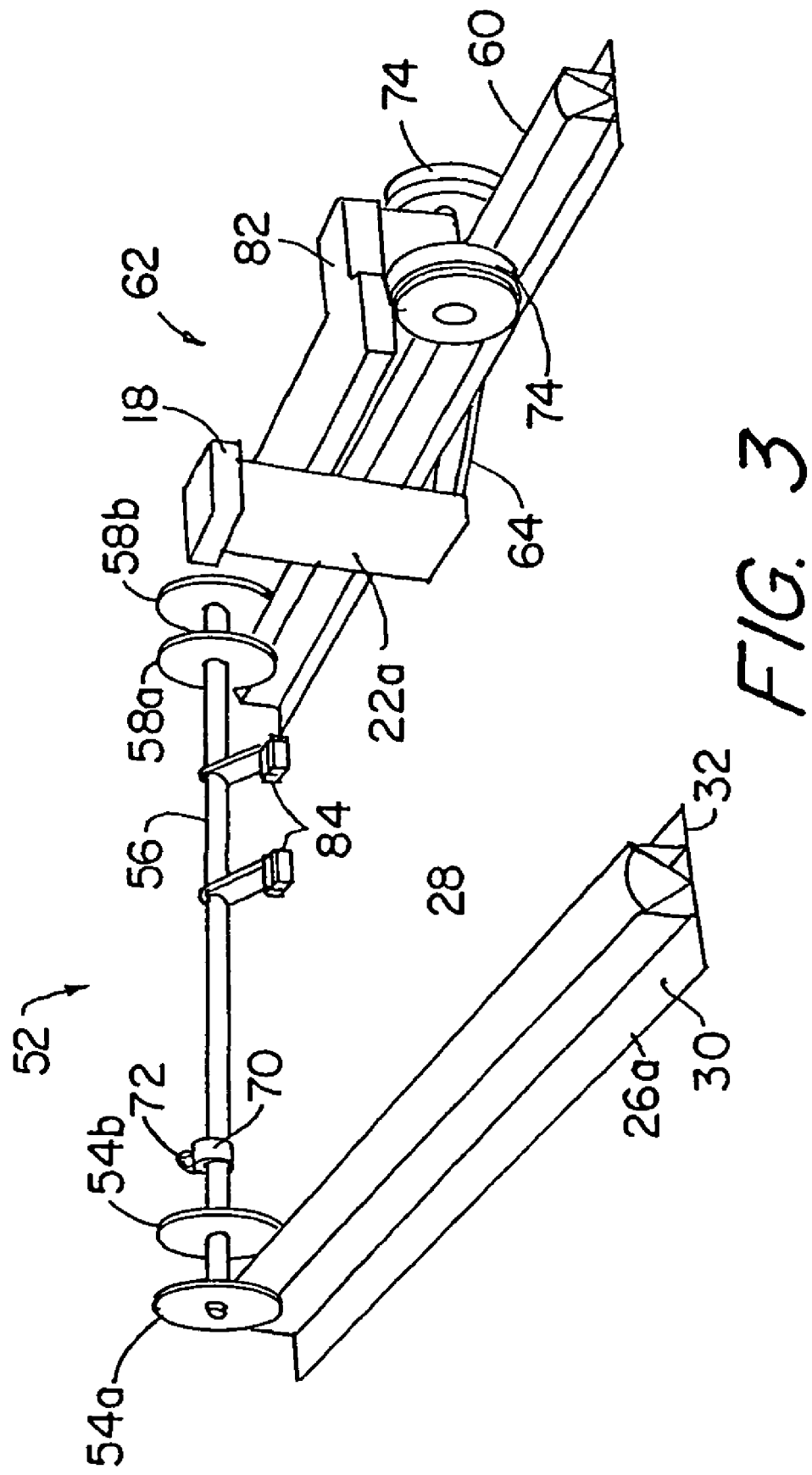
FIG. 3 is a perspective view of an assembly for attachment to portions of the machine of FIG. 1 in order to convert the prior art machine to a machine of the type shown in FIG. 2.
Figure 5:
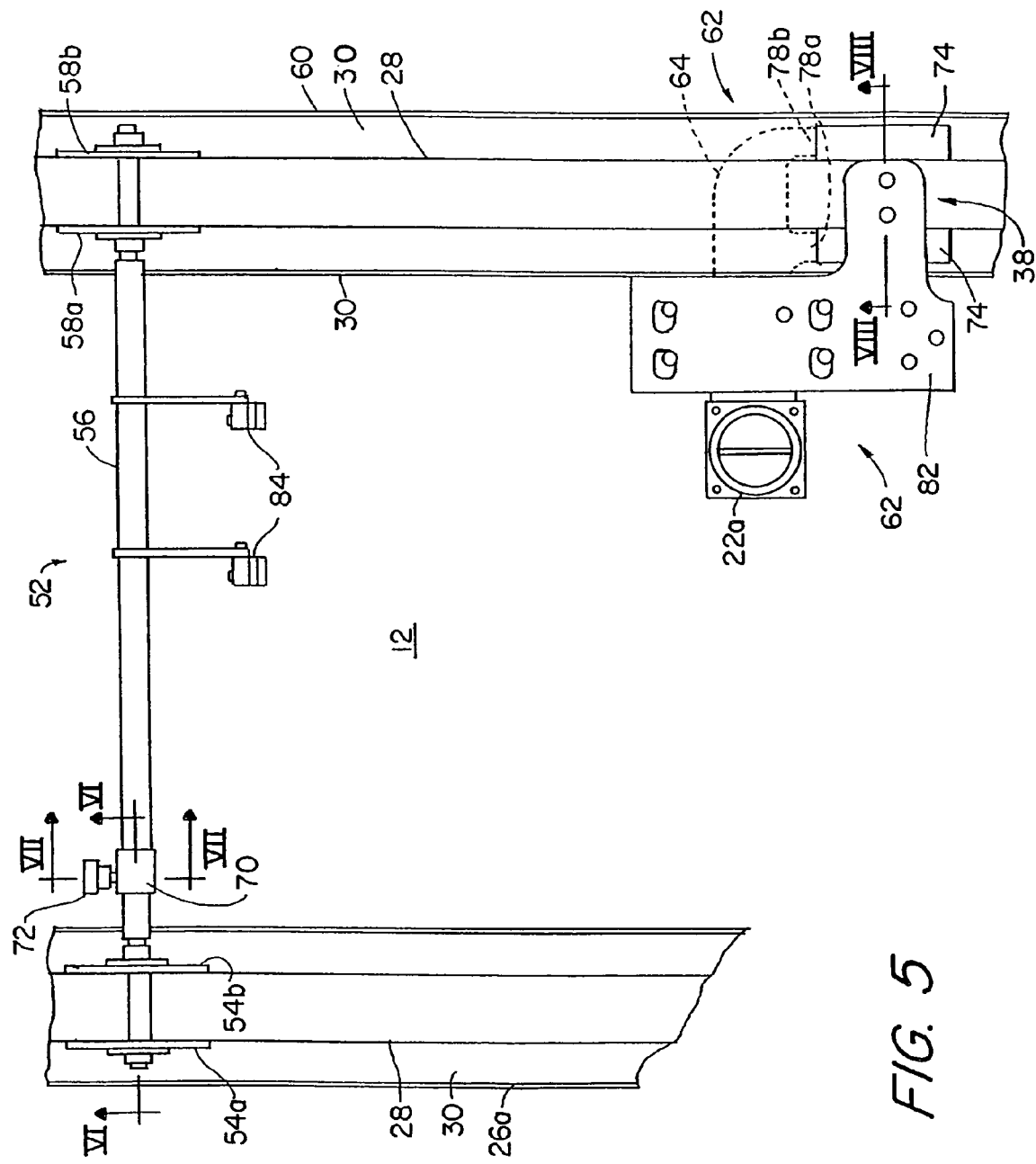
FIG. 5 is a top plan view of the assembly of FIG. 3.
Figure 7:
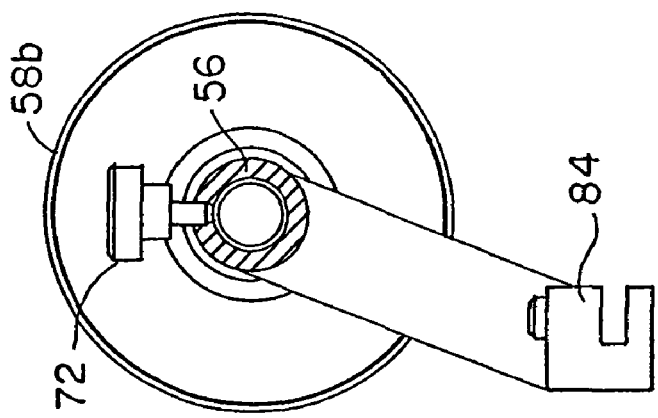
FIG. 7 is a sectional view taken along line VII-VII of FIG. 5.

The axle assembly 56 constitutes an assembly of telescopically combined elements 66, 68 (FIG. 6) and a clamp 70 and locking screw 72 (FIGS. 3, 5 and 7). Thus, the length of the axle assembly 56 is readily adjustable and selectable to provide a selected spacing between strips.

Figure 4:
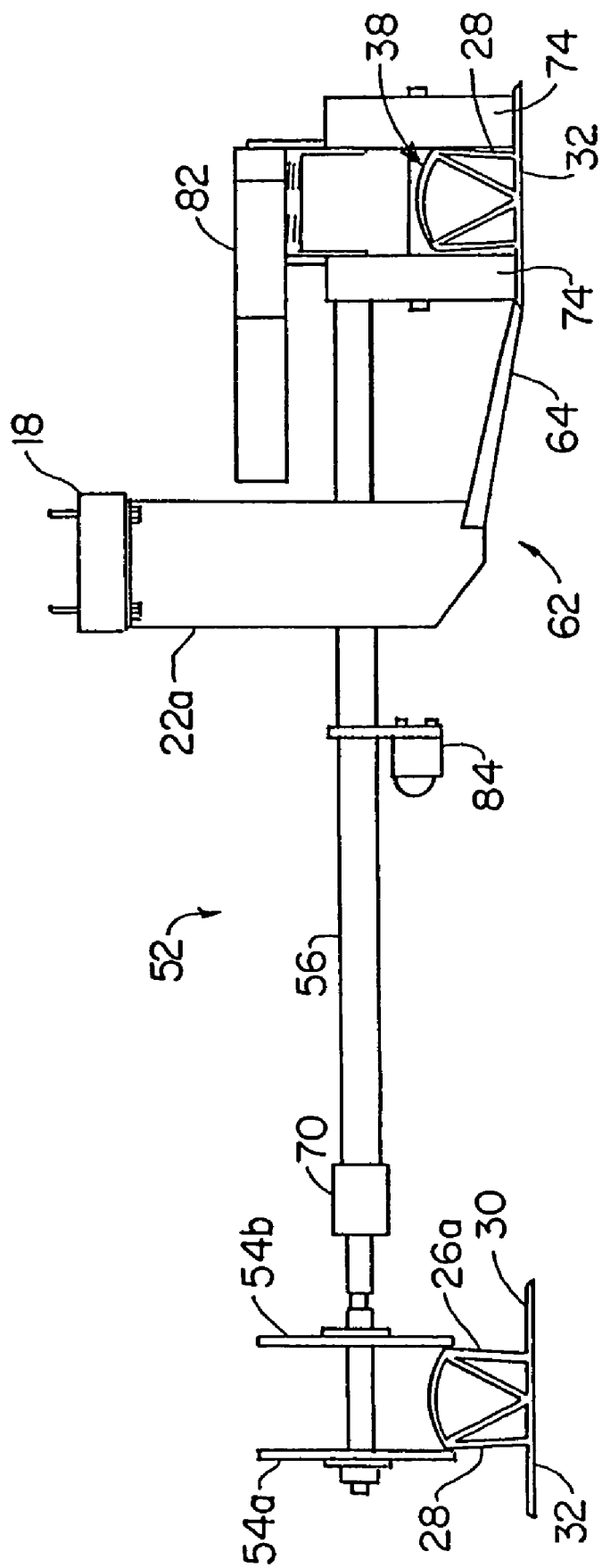
FIG. 4 is a front elevational view of the assembly of FIG. 3.
Figure 8:
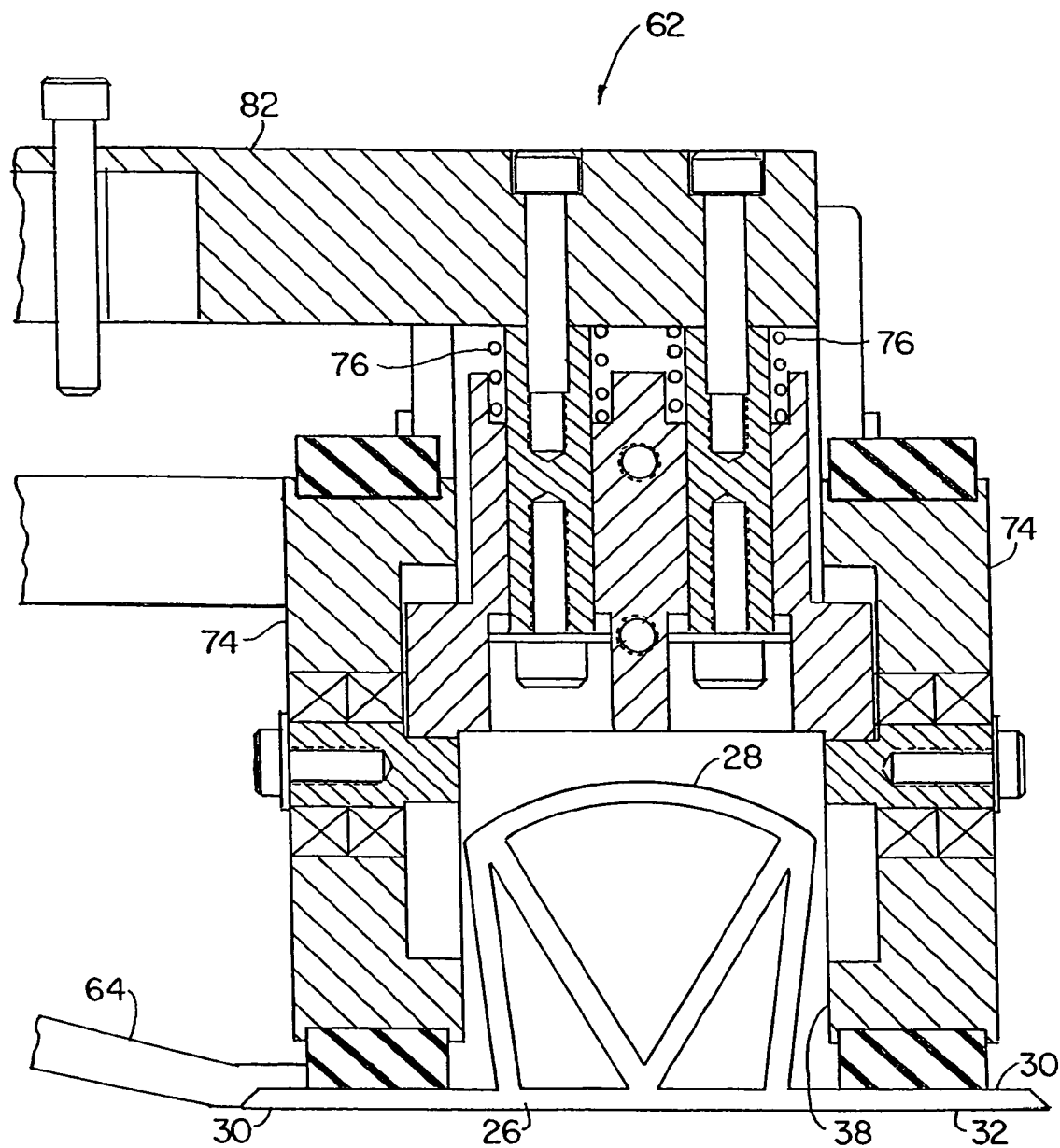
FIG. 8 is a sectional view taken along line VIII-VIII of FIG. 5.

The welding station 62 is provided with a chamber 22a, the extended nozzle 64, and the weld wheels 74 (FIGS. 4 and 5). In the weld wheel arrangement shown in FIG. 8, the weld wheels 74 are spring biased by springs 76 to provide a downward bias. The weld wheels 74 are separated from each other side by side so as to provide the gap 38 therebetween for the passage of the strip central portion 28. In addition to the springs 76, further biasing means, such as the weight members 40 (FIG. 1), may be employed.

Figure 2A:
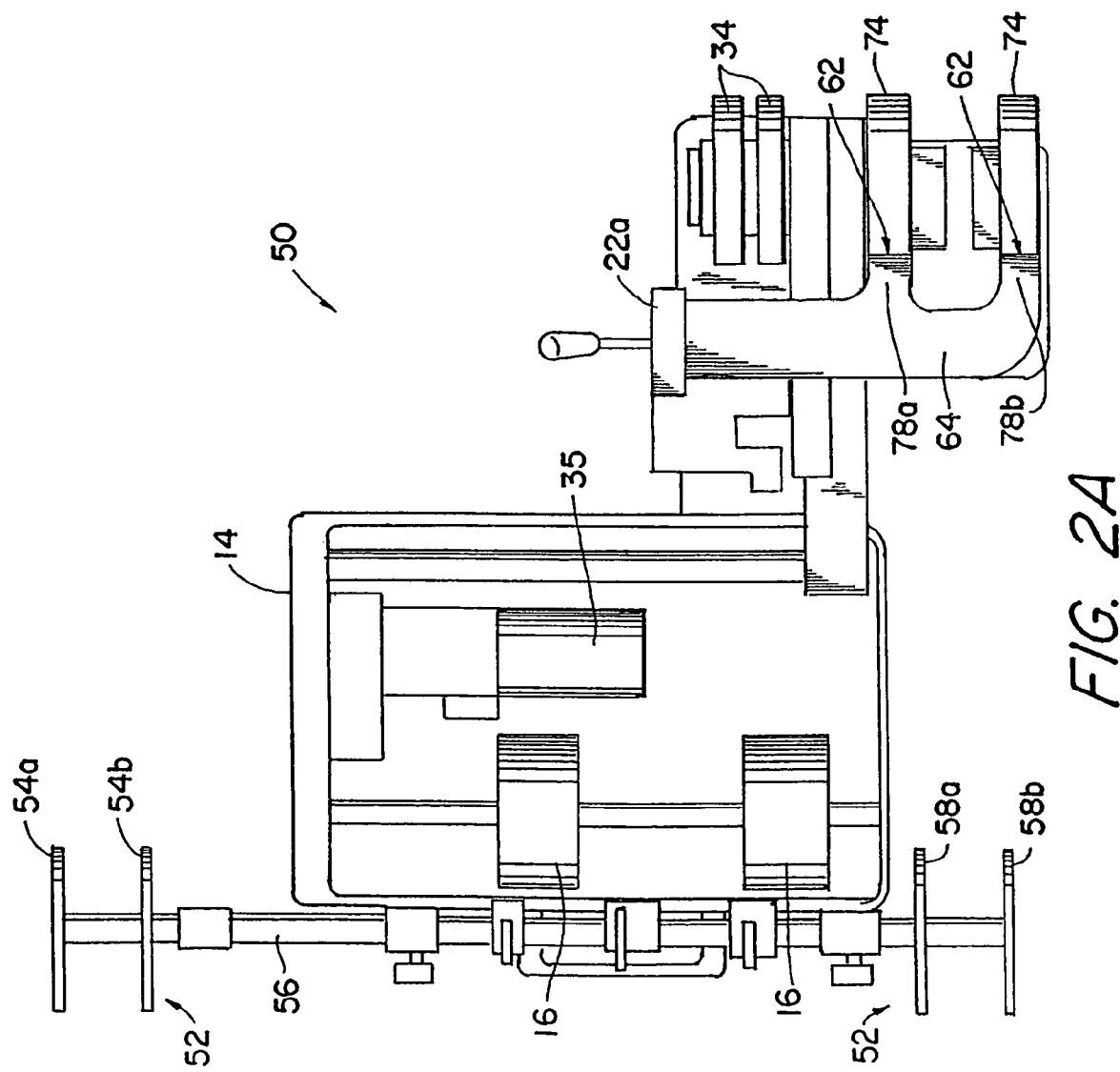
FIG. 2A is a bottom view of the machine of FIG. 2.
Figure 2B:
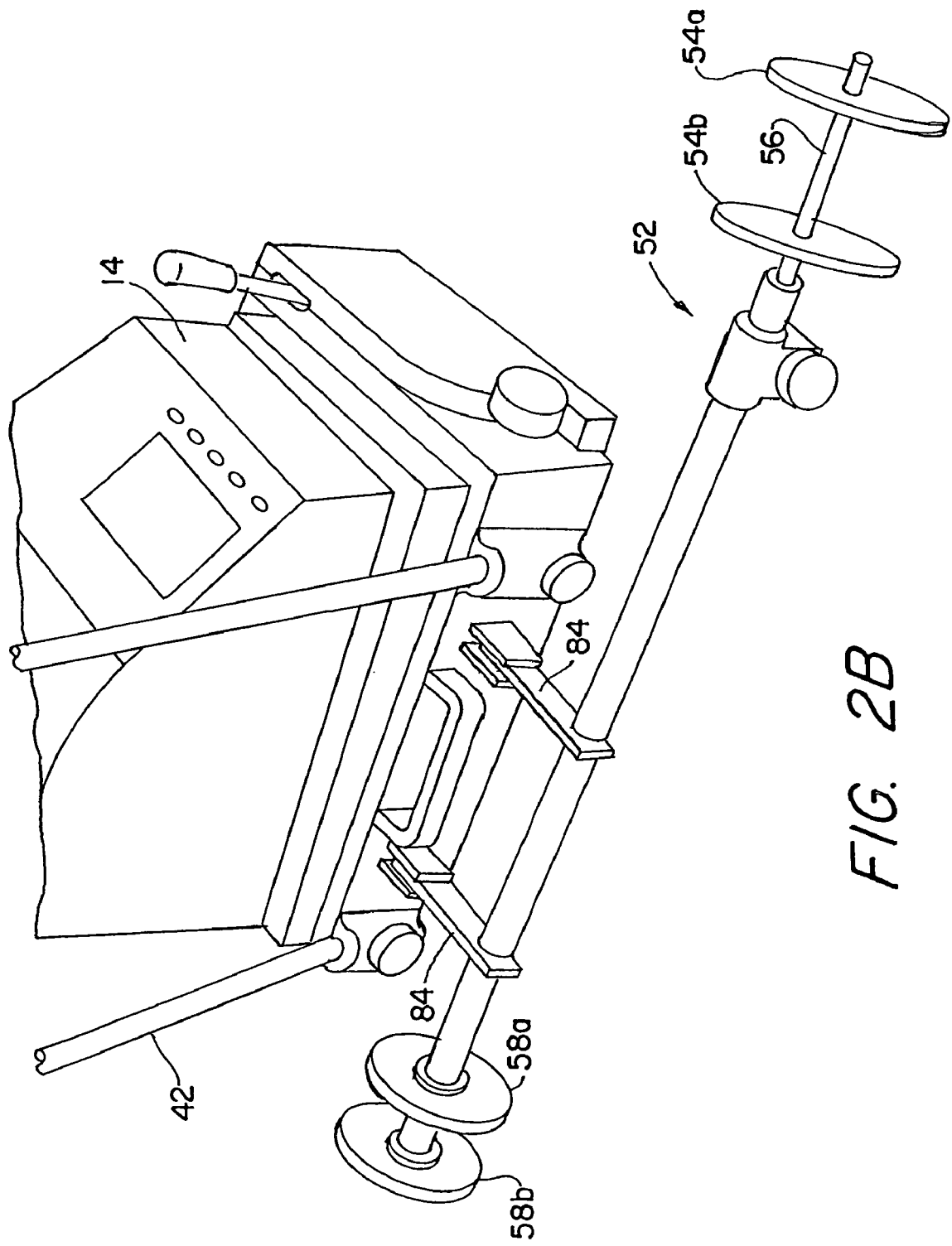
FIG. 2B is a generally front perspective and left side view of the machine of FIG. 2.
Figure 2C:
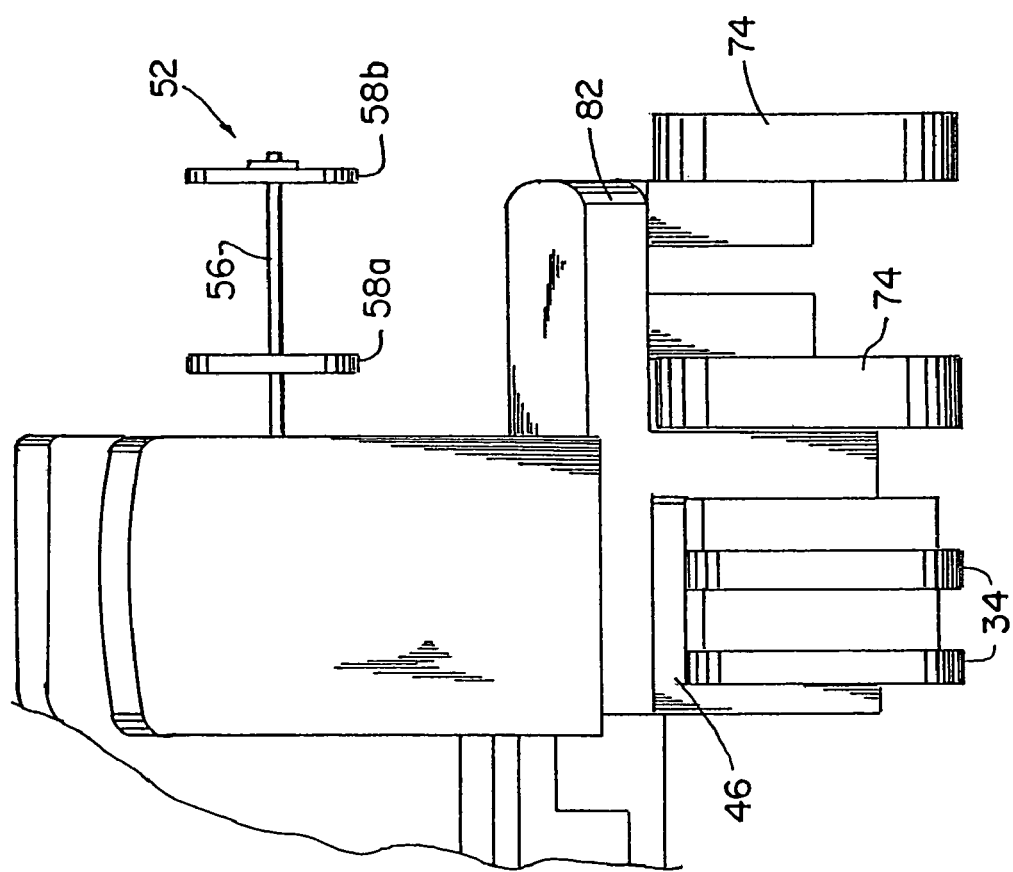
FIG. 2C is a general rear perspective view of the machine of FIG. 2.
Figure 2D:
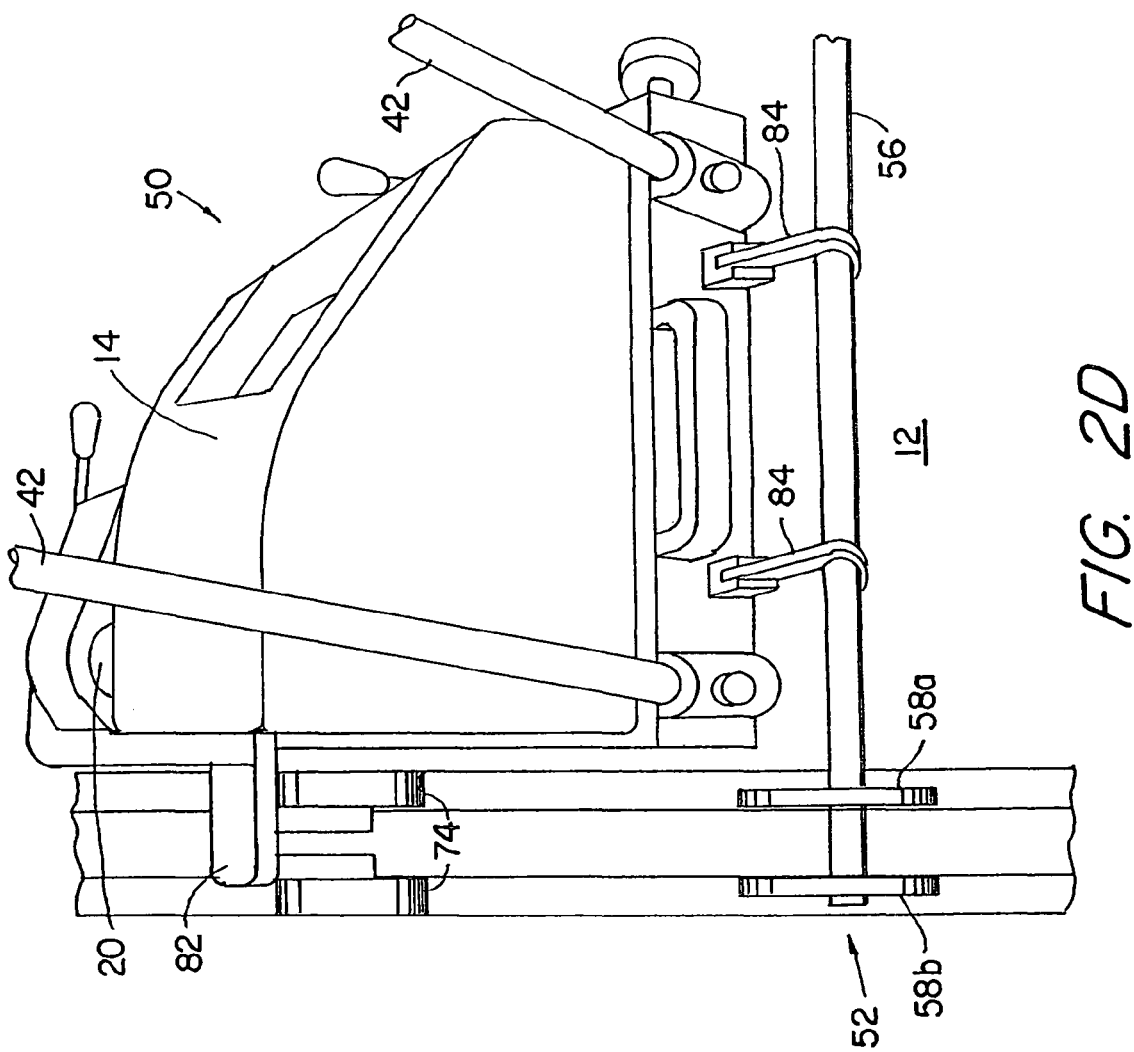
FIG. 2D is a general front and right side perspective view of the machine of FIG. 2.

Referring to FIGS. 2A and 5, it will be seen that the nozzle 64 may be provided with two side-by-side outlets 78a, 78b, each of the outlets being adapted to direct heated air from the chamber 22a between and onto an underside of a strip flange portion 30 and an upper surface of the membrane 12.

In FIGS. 3-8 there is shown the assembly 52 which may be mounted on a machine of the type shown in FIG. 1 to convert the machine to one of the type shown in FIG. 2.

The assembly 52 includes the axle assembly 56, the first pair of guide wheels 54a, 54b, the second pair of guide wheels 58a, 58b, and the welding station 62. The welding station 62, in turn, includes the chamber 22a and the extended nozzle 64, which may be of either the single outlet type, as shown in FIG. 1, or the double outlet type, as shown in FIGS. 2A and 5. The welding station 62 further includes the weld wheels 74 and a platform 82 on which the weld wheels 74 are mounted and on which the weight member or members 40 may be mounted.

The assembly 52 further includes bracket members 84 by which the axle assembly 56 and guide wheels 54a, 54b, 58a, 58b may be fixed to the machine 10. Similarly, the hot air chamber 22a is provided with the heating element 18 and is in communication with the conduit 20 of the machine 10. The platform 82 us adapted for attachment to a similar platform 46 (FIG. 2C) on the machine 10.

In operation, the axle 56 is attached to the machine housing 14 by bracket members 84. The machine chamber 22 and nozzle 24 are replaced by chamber 22a, and nozzle 64. The platform 82, with the weld wheels 74 appended thereto, is fixed to the platform 46, the "new" weld wheels 74 being disposed alongside and outboard of the "old" weld wheels 34. The converted machine is then in condition for operation with the guide wheels 54a, 54b and 58a,58b determining the position of the second strip 60 and subsequent strips.

There is thus provided an improved machine and method, and an assembly for improving existing machines, for welding thermoplastic strips to thermoplastic membranes.

It will be understood that many additional changes in the details, materials, method steps and arrangement of parts, which have been herein described and illustrated in order to explain the nature of the invention, may be made by those skilled in the art within the principles and scope of the invention as expressed in the appended claims.

What is claimed is:

1. A method for applying strips of thermoplastic material to thermoplastic membranes, the strips each having an upstanding central portion extending lengthwise thereof and opposed flange portions extending widthwise from a base of the central portion, the method comprising the steps of:

applying a first thermoplastic strip to a thermoplastic membrane;

providing apparatus comprising:
   a self-propelled housing assembly having drive wheels thereon for movably supporting said housing on the membranes;
   a guide assembly fixed to said housing assembly, said guide assembly comprising:
      a first pair of guide wheels for disposition around the previously applied first strip, and movable along the first strip with one guide wheel on either side thereof; and
      a second pair of guide wheels for disposition around a second strip to be applied, and movable along the second strip so as to guide the second strip to a welding station mounted on the apparatus, the welding station being adapted to heat weld the second strip to at least one of the membranes;

mounting the first pair of guide wheels on the first strip;

mounting the second pair of guide wheels on the second strip; and moving the housing on the drive wheels, the first pair of guide wheels riding along the first strip and the second pair of guide wheels channeling the second strip therebetween and into the welding station for attachment to the membrane by the heat weld, the second strip thereby extending equidistantly from the first strip.

2. The method in accordance with claim 1 wherein the guide assembly further comprises an axle supporting the first and second pairs of guide wheels respectively mounted proximate opposite ends of the axle, and the mounting of the guide wheels on the strips comprises placing the first pair of guide wheels on the first strip and placing the second strip between the second pair of guide wheels.

3. The method in accordance with claim 2 wherein the axle is adjustable in length, and the method comprises the further step of adjusting the length of the axle to selectively determine the spacing between the first and second pairs of guide wheels.

4. The method in accordance with claim 1 and comprising the further step of moving side-by-side weld wheels mounted on the welding station along the opposed flange portions of the second strip immediately after the weld station.

\* \* \* \* \*